(12) United States Patent
Shimoda et al.

(10) Patent No.: US 8,815,347 B2
(45) Date of Patent: Aug. 26, 2014

(54) ANTIOXIDANT AGENT AND PROCESS FOR PRODUCING METALLIC MATERIAL

(75) Inventors: Kazuhiro Shimoda, Tokyo (JP); Keishi Matsumoto, Tokyo (JP); Yasuyoshi Hidaka, Tokyo (JP); Tomio Yamakawa, Tokyo (JP); Shuichi Akiyama, Osaka (JP); Takahisa Kato, Handa (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/880,780

(22) PCT Filed: Jul. 13, 2011

(86) PCT No.: PCT/JP2011/066013
§ 371 (c)(1),
(2), (4) Date: Apr. 22, 2013

(87) PCT Pub. No.: WO2012/056771
PCT Pub. Date: May 3, 2012

(65) Prior Publication Data
US 2013/0202803 A1    Aug. 8, 2013

(30) Foreign Application Priority Data
Oct. 26, 2010  (JP) .................. 2010-239950

(51) Int. Cl.
| | | |
|---|---|---|
| *B05D 3/02* | (2006.01) | |
| *C03C 8/22* | (2006.01) | |
| *C03C 8/02* | (2006.01) | |
| *C03C 8/14* | (2006.01) | |
| *C03C 8/16* | (2006.01) | |
| *C09K 15/02* | (2006.01) | |

(52) U.S. Cl.
CPC ... *C03C 8/22* (2013.01); *C03C 8/02* (2013.01); *C03C 8/14* (2013.01); *C03C 8/16* (2013.01); *C09K 15/02* (2013.01); *B05D 3/02* (2013.01)
USPC ............................ 427/372.2; 501/16; 501/17

(58) Field of Classification Search
None
See application file for complete search history.

(56) References Cited

U.S. PATENT DOCUMENTS

| | | | | |
|---|---|---|---|---|
| 4,084,975 | A | * | 4/1978 | Faust ............................ 501/16 |
| 6,001,494 | A | * | 12/1999 | Kuchinski et al. ............. 428/653 |
| 6,511,931 | B1 | * | 1/2003 | Baldwin ........................ 501/16 |
| 2002/0031656 | A1 | * | 3/2002 | Kotama et al. ............. 428/304.4 |
| 2005/0014625 | A1 | * | 1/2005 | Espargilliere et al. .......... 501/48 |
| 2007/0265154 | A1 | * | 11/2007 | Baldwin et al. ................. 501/16 |
| 2007/0290590 | A1 | * | 12/2007 | Hoffman ....................... 313/141 |

FOREIGN PATENT DOCUMENTS

| | | | |
|---|---|---|---|
| EP | 2014747 | * | 1/2009 |
| JP | 48-017460 | | 3/1973 |
| JP | 01-224239 | | 9/1989 |
| JP | 06-504302 | | 5/1994 |
| JP | 2003-221688 | | 8/2003 |
| JP | 2007-314780 | | 12/2007 |
| JP | 2007-314875 | | 12/2007 |
| WO | 2007/122972 | | 11/2007 |

* cited by examiner

*Primary Examiner* — Erma Cameron
(74) *Attorney, Agent, or Firm* — Clark & Brody

(57) ABSTRACT

There is provided an antioxidant agent excellent in anti-dripping property and anti-peeling property. The antioxidant agent in accordance with the present invention contains a plurality of glass frits having different softening points, potter's clay, and bentonite and/or sepiolite. On account of the potter's clay, the antioxidant agent applied to the surface of a metallic starting material is less liable to drip down. Further, on account of the bentonite and/or sepiolite, the antioxidant agent is less liable to peel off the surface of the metallic starting material.

5 Claims, 4 Drawing Sheets

US 8,815,347 B2

ANTIOXIDANT AGENT AND PROCESS FOR PRODUCING METALLIC MATERIAL

TECHNICAL FIELD

The present invention relates to an antioxidant agent and a process for producing a metallic material. More particularly, it relates to an antioxidant agent applied to the surface of a metallic starting material to be heated, and a process for producing a metallic material.

BACKGROUND ART

JP2007-314780A (Patent Document 1) discloses an antioxidant agent for hot extrusion working, and WO2007/122972 (Patent Document 2) discloses an antioxidant agent for hot plastic working. The antioxidant agents disclosed in these Patent Documents contain a plurality of glass frits having different softening points, and are applied to the surface of a starting material to be subjected to hot plastic working. A metallic starting material to which the antioxidant agent has been applied is heated at a temperature of 800 to 1300° C. in a heating furnace or the like. The antioxidant agents disclosed in Patent Documents 1 and 2 prevent oxides (hereinafter, referred to as scale) from being formed on the surface of the heated metallic starting material.

DISCLOSURE OF THE INVENTION

The above-described antioxidant agent is in a liquid form, and is applied to the surface of metallic starting material at normal temperature. At this time, it is more favorable if the antioxidant agent is less liable to drip down from the surface of metallic starting material. That is, the antioxidant agent is required to have an anti-dripping property.

Further, although the antioxidant agent applied to the surface of metallic starting material at normal temperature is in a liquid form, the antioxidant agent is solidified when it is dehydrated by heating or drying. It is more favorable if the solidified antioxidant agent is less liable to be peeled off the surface of metallic starting material. That is, the antioxidant agent is also required to have an anti-peeling property.

An objective of the present invention is to provide an antioxidant agent excellent in anti-dripping property and anti-peeling property.

The antioxidant agent in accordance with an embodiment of the present invention is to be applied to the surface of metallic starting material to be heated. The antioxidant agent contains a plurality of glass frits having different softening points, potter's clay, and bentonite and/or sepiolite.

The antioxidant agent in accordance with this embodiment has an excellent anti-dripping property due to the potter's clay. The antioxidant agent in accordance with this embodiment further has an excellent anti-peeling property due to the bentonite and/or sepiolite.

Preferably, the plurality of glass frits contain high-temperature glass frits and medium-temperature glass frits. The viscosity at 1200° C. of the high-temperature glass frits is $2\times10^2$ to $10^6$ dPa·s. The viscosity at 700° C. of the medium-temperature glass frits is $2\times10^2$ to $10^6$ dPa·s.

In this case, the antioxidant agent can prevent the oxidation of the surface of metallic starting material in a board temperature range.

Preferably, the antioxidant agent contains not less than 6 weight parts of potter's clay with respect to 100 weight parts of the high-temperature glass frits and not less than 4 weight parts of bentonite and/or sepiolite with respect to 100 weight parts of the high-temperature glass frits.

In this case, the adhesive property and anti-peeling property of the antioxidant agent are further improved.

Preferably, the antioxidant agent contains less than 9 weight parts of bentonite and/or sepiolite with respect to 100 weight parts of the high-temperature glass frits.

In this case, the antioxidant agent is liable to be slurried.

Preferably, the antioxidant agent further contains an inorganic compound having a melting point of 400 to 600° C. Preferably, the inorganic compound is boric acid and/or boron oxide.

In this case, the antioxidant agent can further prevent the oxidation of the heated metallic starting material.

BEST MODE FOR CARRYING OUT THE INVENTION

Figure 1:
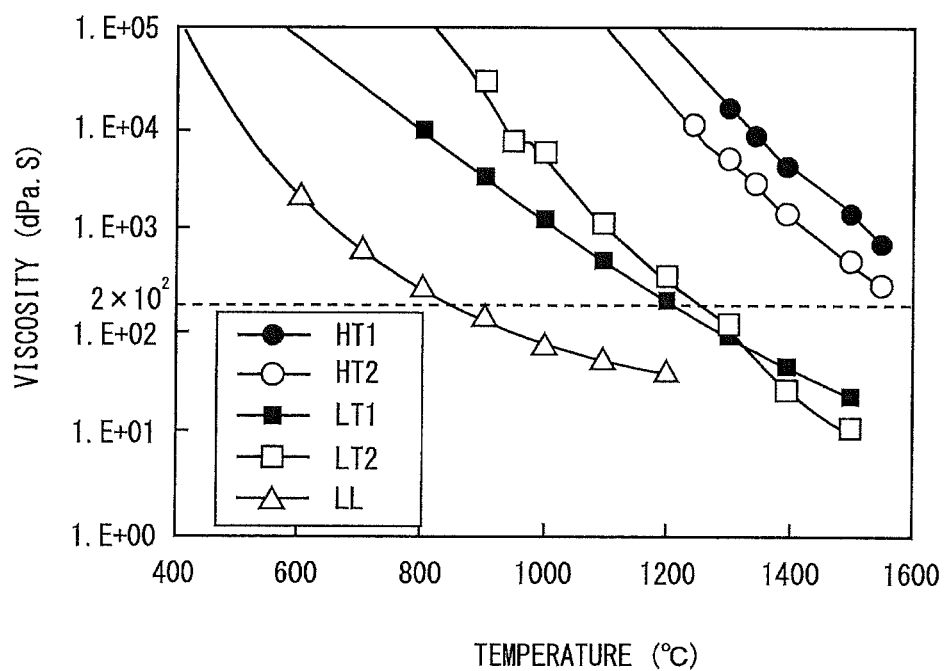
FIG. 1 is a diagram showing the relationship between the viscosity and temperature of each of the components contained in an antioxidant agent in accordance with an embodiment of the present invention.

Embodiments of the present invention will now be described in detail with reference to the accompanying drawings.

The present inventors conducted studies on the anti-dripping property and anti-peeling property of the antioxidant agent, and obtained the findings described below.

(1) The potter's clay improves the anti-dripping property of the antioxidant agent. More specifically, when the liquid-form antioxidant agent containing the potter's clay is applied to the surface of metallic starting material at normal temperature, the antioxidant agent is liable to adhere to the surface of metallic starting material, and is less liable to drip down.

(2) The bentonite and/or sepiolite improve the anti-peeling property of the antioxidant agent. More specifically, when the antioxidant agent containing the bentonite and/or sepiolite is applied to the surface of metallic starting material and is solidified by drying, the solidified antioxidant agent is less liable to peel off the surface of metallic starting material.

The antioxidant agent in accordance with this embodiment is based on the above-described findings. Hereunder, the details of the antioxidant agent are explained.

[Constitution of Antioxidant Agent]

The antioxidant agent in accordance with this embodiment contains the plurality of glass frits having different softening points and a suspending agent. The suspending agent contains potter's clay and bentonite and/or sepiolite. Hereunder, the glass frits and the suspending agent are explained.

[Glass Frits]

The plurality of glass frits are produced by the process described below. A plurality of well-known inorganic components constituting glass are mixed with each other. The mixed plurality of inorganic components are melted to produce molten glass. The molten glass is rapidly cooled in water or air and is solidified. The solidified glass is ground as necessary. The glass frits are produced by the steps described above.

The glass frits are of a flake form or a powder form. As described above, the glass frits contain the plurality of well-known inorganic components. Therefore, the melting point of glass frits is not identified definitely. In the case where each of inorganic components in the glass frits is heated singly, each inorganic component liquefies at its melting point. However, in the case of glass frits, as the temperature rises, the inorganic components in the glass frits begin to liquefy at temperatures different from each other. For this reason, with the increase in temperature, the glass frits soften gradually. Therefore, as compared with the case where the inorganic components are used singly as an antioxidant agent, the glass frits produced by melting the plurality of inorganic components are liable to adhere stably to the surface of the heated metallic starting material. The glass frits can be regulated so as to have a viscosity suitable for coating the surface of metallic starting material.

The antioxidant agent contains the plurality of glass frits having different softening points. Preferably, the plurality of glass frits contain high-temperature glass frits and medium-temperature glass frits. The high-temperature glass frits have a softening point higher than that of the medium-temperature glass frits. Hereunder, the details of the high-temperature glass frits and medium-temperature glass frits are explained.

[High-Temperature Glass Frits]

The high-temperature glass frits have a high softening point. The antioxidant agent has a proper viscosity in a high-temperature range of not lower than 1000° C. on account of the plurality of high-temperature glass frits. The antioxidant agent can wettingly spread on the surface of metallic starting material in a high-temperature range of not lower than 1000° C., and can cover the metal surface. At this time, the antioxidant agent adheres to the surface of metallic starting material.

In effect, due to the high-temperature glass frits, the antioxidant agent prevents the surface of metallic starting material from coming into contact with the outside air in the high-temperature range. Therefore, the antioxidant agent can prevent scale from being produced on the surface of metallic starting material in the high-temperature range.

If the antioxidant agent does not contain the high-temperature glass frits, in the high-temperature range, the viscosity of the antioxidant agent becomes too low. Therefore, the antioxidant agent becomes less liable to adhere stably to the surface of metallic starting material, and becomes liable to flow down from the surface. If the antioxidant agent flows down, the surface of metallic starting material is partially exposed. The exposed surface portion comes into contact with the outside air, and scale is produced.

The preferable viscosity at 1200° C. of the high-temperature glass frits is $2 \times 10^2$ to $10^6$ dPa·s. If the viscosity at 1200° C. of the high-temperature glass frits is too low, in the high-temperature range, the antioxidant agent is less liable to adhere to the surface of metallic starting material, and is liable to flow down from the surface of metallic starting material. On the other hand, if the viscosity at 1200° C. of the high-temperature glass frits is too high, in the high-temperature range, the antioxidant agent is liable to peel off the surface of metallic starting material. If the viscosity at 1200° C. of the high-temperature glass frits is $2 \times 10^2$ to $10^6$ dPa·s, in a high-temperature range of 1000 to 1400° C., the high-temperature glass frits soften, and become liable to adhere to the surface of metallic starting material. Therefore, in the high-temperature range, the antioxidant agent is liable to cover the surface of metallic starting material, and is liable to adhere stably to the surface of metallic starting material. The upper limit of the preferable viscosity at 1200° C. of the high-temperature glass frits is $10^5$ dPa·s, and the lower limit thereof is $10^3$ dPa·s. The viscosity in this description means so-called "static viscosity".

In the case where the high-temperature glass frits are of a spherical powder form, the preferable particle diameter is not larger than 25 μm. The particle diameter herein is a volume mean particle diameter $D_{50}$. The volume mean particle diameter $D_{50}$ is determined by the method described below. By using a particle counter, the volume particle size distribution of the high-temperature glass frits is determined. By using the obtained volume particle size distribution, the particle diameter at which the cumulative volume becomes 50% from the small particle diameter side in a cumulative volume distribution is defined as a volume mean particle diameter $D_{50}$. If the particle diameter is not larger than 25 μm, at normal temperature, the high-temperature glass frits are liable to disperse in a liquid.

As described above, the high-temperature glass frits contain the plurality of well-known inorganic components. For example, the high-temperature glass frits contain 60 to 70 mass % of silicon dioxide ($SiO_2$), 5 to 20 mass % of aluminum oxide ($Al_2O_3$), and 0 to 20 mass % of calcium oxide (CaO). Calcium oxide is an optional compound, and need not be contained. Further, the high-temperature glass frits may contain one or more kinds of magnesium oxide (MgO), zinc oxide (ZnO), and potassium oxide ($K_2O$). The inorganic components constituting the high-temperature glass frits are not limited to the above-described examples. In effect, the high-temperature glass frits can be produced by the well-known inorganic components constituting the glass.

[Medium-Temperature Glass Frits]

The medium-temperature glass frits have a softening point lower than that of the high-temperature glass frits. The antioxidant agent has a proper viscosity in a medium-temperature range of 600 to 1000° C. on account of the medium-temperature glass frits. Therefore, the antioxidant agent wettingly spreads on the whole surface of the metallic starting material not only in the high-temperature range but also in the medium-temperature range, and covers the surface. Further, in the medium-temperature range, the antioxidant agent adheres stably to the surface of metallic starting material. Therefore, in the medium-temperature range, the surface of metallic starting material is prevented from coming into contact with the outside air, and the production of scale is prevented.

If the antioxidant agent does not contain the medium-temperature glass frits, the antioxidant agent in the medium-temperature range is less liable to adhere to the surface of metallic starting material. Therefore, in the medium-temperature range, the antioxidant agent flows down from the surface of metallic starting material, or peels off, and thereby the surface of metallic starting material is partially exposed. The exposed portion comes into contact with the outside air, and scale is liable to be produced.

The preferable viscosity at 700° C. of the medium-temperature glass-frits is $2 \times 10^2$ to $10^6$ dPa·s. If the viscosity of the medium-temperature glass-frits is too low, in the medium-temperature range, the antioxidant agent is less liable to adhere to the surface of metallic starting material, and is liable to drip down from the surface of metallic starting material. On the other hand, if the viscosity of the medium-temperature glass-frits is too high, the antioxidant agent does not soften sufficiently in the medium-temperature range. Therefore, the antioxidant agent becomes liable to peel off the surface of metallic starting material. If the viscosity at 700° C. of the medium-temperature glass-frits is $2\times10^2$ to $10^6$ dPa·s, in the medium-temperature range of 600 to 1000° C., the medium-temperature glass-frits soften, and become liable to adhere to the surface of metallic starting material. Therefore, in the medium-temperature range, the antioxidant agent becomes liable to cover the surface of metallic starting material. The upper limit of the preferable viscosity at 700° C. of the medium-temperature glass frits is $10^5$ dPa·s, and the lower limit thereof is $10^3$ dPa·s.

In the case where the medium-temperature glass frits are of a spherical powder form, the preferable particle diameter of the medium-temperature glass frits is not larger than 25 μm. The definition of the particle diameter of the medium-temperature glass frits is the same as that of the above-described particle diameter of the high-temperature glass frits. That is, the particle diameter of the medium-temperature glass frits is the volume mean particle diameter $D_{50}$. If the particle diameter is not larger than 25 μm, the medium-temperature glass frits disperse stably in a liquid. Therefore, when the antioxidant agent is applied to the surface of metallic starting material, the medium-temperature glass frits are liable to disperse substantially uniformly to the whole surface of the metallic starting material.

For example, the medium-temperature glass frits contain 40 to 60 mass % of $SiO_2$, 0 to 10 mass % of $Al_2O_3$, 20 to 40 mass % of $B_2O_3$, 0 to 10 mass % of ZnO, and 5 to 15 mass % of $Na_2O$. Further, the medium-temperature glass frits may contain at least one kind of MgO, CaO, and $K_2O$. The inorganic components constituting the medium-temperature glass frits are not limited to the above-described examples. The medium-temperature glass frits can be produced by the well-known inorganic components constituting the glass.

In the antioxidant agent, the preferable content of the medium-temperature glass frits is 4 to 20 weight parts with respect to 100 weight parts of the high-temperature glass frits.
[Water]

The antioxidant agent further contains water. Water is mixed with the high-temperature glass frits, the medium-temperature glass frits, and the low-temperature inorganic compound to produce slurry. If water is mixed, the antioxidant agent turns to slurry. Therefore, the antioxidant agent is liable to be applied substantially uniformly to the surface of metallic starting material before being heated.

In the antioxidant agent, the preferable content of water is 100 to 150 weight parts with respect to 100 weight parts of the high-temperature glass frits. If the water content is too low or too high, the antioxidant agent is less liable to be applied. If the water content is regulated, the viscosity of the antioxidant agent can be regulated to such a degree that the antioxidant agent can be applied to the surface of metallic starting material substantially uniformly at normal temperature.
[Suspending Agent]

The suspending agent causes the high-temperature and medium-temperature glass frits and the like to disperse substantially uniformly in a solution (water). The suspending agent contains potter's clay and bentonite and/or sepiolite. Due to the potter's clay and bentonite and/or sepiolite, the antioxidant agent in accordance with this embodiment is less liable to drip down when being applied to the surface of metallic starting material, and is less liable to peel off the surface of metallic starting material when being dried and solidified. Hereunder, the potter's clay and the bentonite and/or sepiolite are explained.
[Potter's Clay]

The potter's clay contains kaolinic clay and a plurality of quartz particles. More specifically, the potter's clay contains kaolinite, hallosite, and quartz.

The potter's clay improves the anti-dripping property of liquid-form antioxidant agent. The antioxidant agent containing potter's clay is less liable to drip down after being applied to the surface of metallic starting material at normal temperature. Therefore, the antioxidant agent is liable to cover the whole surface of metallic starting material at normal temperature.

In the antioxidant agent, the content of potter's clay is preferably not lower than 6 weight parts with respect to 100 weight parts of the high-temperature glass frits. In this case, the anti-dripping property at normal temperature of the antioxidant agent improves. The content of potter's clay is further preferably not lower than 7 weight parts, and still further preferably not lower than 10 weight parts. If the antioxidant agent contains potter's clay excessively, the glass frits in the antioxidant agent become less liable to disperse on the surface of metallic starting material uniformly, and the oxidation preventing function of the antioxidant agent decreases. Therefore, the upper limit of the preferable content of potter's clay is 30 weight parts.

However, even if the content of potter's clay is lower than 6 weight parts, the anti-dripping property at normal temperature of the antioxidant agent can be achieved to some extent.
[Bentonite and/or Sepiolite]

The bentonite is clay consisting mainly of montmorillonite. The bentonite further may contain silicic acid ore such as quartz and opal, silicate ore such as feldspar and zeolite, carbonate ore such as dolomite and sulfate ore, sulfide ore such as pyrite, and the like.

Sepiolite is a water-containing magnesium silicate, and is denoted by a chemical formula of $Mg_8Si_{12}O_{30}(OH)_4(OH_2)_4 \cdot 8H_2O$, for example.

Either of the bentonite and sepiolite improves the anti-peeling property of the antioxidant agent. Specifically, the liquid-form antioxidant agent is applied to the surface of metallic starting material. Then, by heating or drying, the moisture of the antioxidant agent applied to the surface of metallic starting material is evaporated, and the antioxidant agent is solidified. The bentonite and sepiolite prevents the solidified antioxidant agent from peeling off the surface of metallic starting material. The antioxidant agent containing the bentonite and/or sepiolite is less liable to peel off even when being subjected to an external force. The antioxidant agent may contain at least one kind of bentonite and sepiolite.

In the antioxidant agent, the preferable content of bentonite and/or sepiolite is not lower than 4 weight parts with respect to 100 weight parts of the high-temperature glass frits. In the case where the antioxidant agent contains the bentonite and sepiolite, the total content of bentonite and sepiolite is preferably not lower than 4 weight parts. If the content of bentonite and/or sepiolite is not lower than 4 weight parts, the anti-peeling property of the antioxidant agent further improves.

Also, the preferable content of bentonite and/or sepiolite is lower than 9 weight parts with respect to 100 weight parts of the high-temperature glass frits. In the case where the antioxidant agent contains the bentonite and sepiolite, the total content of bentonite and sepiolite is preferably lower than 9 weight parts. If the content of bentonite and/or sepiolite exceeds 9 weight parts, the glass frits become less liable to disperse in the liquid-form antioxidant agent. That is, the antioxidant agent becomes less liable to be slurried.

However, even if the content of bentonite and/or sepiolite exceeds the above-described range, the anti-peeling property of the antioxidant agent can be achieved to some extent.

[Other Components of Suspending Agent]

The suspending agent may contain other clays other than the above-described potter's clay, bentonite, and sepiolite. The clay contains, for example, 50 to 60 mass % of $SiO_2$ and 10 to 40 mass % of $Al_2O_3$, and further contains one or more kinds selected from a group consisting of $Fe_2O_3$, CaO, MgO, $Na_2O$, and $K_2O$ as other minute-amount components.

One example of other clays other than the potter's clay, bentonite, and sepiolite contains about 55 mass % of $SiO_2$, about 30 mass % of $Al_2O_3$, $Fe_2O_3$, CaO, MgO, $Na_2O$, $K_2O$, and the like. Another example of other clays contains about 60 mass % of $SiO_2$ and about 15 mass % of $Al_2O_3$, and contains $Fe_2O_3$, CaO, MgO, $Na_2O$, $K_2O$, and the like as other minute-amount components.

[Other Components of Antioxidant Agent]

The antioxidant agent in accordance with this embodiment may further contain the components described below.

[Low-Temperature Inorganic Compound]

The antioxidant agent in accordance with this embodiment further contains an inorganic compound having a melting point not higher than 600° C. (hereinafter, referred to as a low-temperature inorganic compound). The low-temperature inorganic compound preferably has a melting point of 400 to 600° C. On account of the low-temperature inorganic compound, the antioxidant agent wettingly spreads on the whole surface of the metallic starting material in the low-temperature range of not higher than 600° C., and is liable to adhere to the surface of metallic starting material. That is, in the low-temperature range, the low-temperature inorganic compound prevents the surface of metallic starting material from coming into contact with the outside air, and prevents scale from being produced in the low-temperature range.

The preferable low-temperature inorganic compound is an inorganic salt and/or an oxide having a melting point of 400 to 600° C. The oxide having a melting point not higher than 600° C. is, for example, boric acid ($H_3BO_3$) or boron oxide ($B_2O_3$). If being heated, boric acid turns to boron oxide. The melting point of boron oxide is about 450° C. The inorganic salt having a melting point not higher than 600° C. is, for example, phosphate, thallium bromide (TlBr), or silver metaphosphate ($AgO_3P$). The melting point of thallium bromide is about 480° C., and the melting point of silver metaphosphate is about 480° C. Further preferably, the low-temperature inorganic compound is boric acid and/or boron oxide.

[Relationship Between Viscosities of High-Temperature and Medium-Temperature Glass Frits and Viscosity of Low-Temperature Inorganic Compound]

FIG. 1 is a diagram showing the relationship between the viscosities of high-temperature and medium-temperature glass frits and the viscosity of low-temperature inorganic compound. FIG. 1 was obtained by the process described below. High-temperature glass frits HT1 and HT2, medium-temperature glass frits LT1 and LT2, and low-temperature inorganic compound LL given in Table 1 were prepared.

Referring to Table 1, the low-temperature inorganic compound LL was boron oxide. By heating the components (HT1, HT2, LT1, LT2, and LL), the viscosities at respective temperatures were measured. For the measurement of viscosity, the well-known platinum ball pulling-up method was used. Specifically, a platinum ball submerged in molten glass and molten inorganic compound was pulled up. Based on the load applied to the platinum ball at this time and the pulling-up speed, the viscosities were determined.

Referring to FIG. 1, the symbol "●" in the figure denotes the viscosity of the high-temperature glass frits HT1. The symbol "○" denotes the viscosity of the high-temperature glass frits HT2. The symbol "■" denotes the viscosity of the medium-temperature glass frits LT1. The symbol "□" denotes the viscosity of the medium-temperature glass frits LT2. The symbol "Δ" denotes the viscosity of the low-temperature inorganic compound LL.

Referring to FIG. 1, the viscosity of the low-temperature inorganic compound LL was $2\times10^2$ to $10^6$ dPa·s in the temperature range of 400 to 800° C., and was not lower than $10^3$ dPa·s in the temperature range of not higher than 600° C. The viscosities of the medium-temperature glass frits LT1 and LT2 were $2\times10^2$ to $10^6$ dPa·s in the temperature range of 600 to 1200° C. That is, at 700° C., the viscosities of the medium-temperature glass frits LT1 and LT2 were in the range of $2\times10^2$ to $10^6$ dPa·s. The viscosities of the high-temperature glass frits HT1 and HT2 were $2\times10^2$ to $10^6$ dPa·s in the temperature range of 1000 to 1550° C. That is, at 1200° C., the viscosities of the high-temperature glass frits HT1 and HT2 were in the range of $2\times10^2$ to $10^6$ dPa·s.

As described above, with the increase in temperature, the viscosity lowers in the order of low-temperature inorganic compound, medium-temperature glass frits, and high-temperature glass frits, and softening occurs. On account of the high-temperature glass frits, medium-temperature glass frits, and low-temperature inorganic compound, the antioxidant agent is capable of having a viscosity of a degree such as to be able to adhere stably to the surface of metallic starting material in a broad temperature range (400 to 1550° C.).

[Antislipping Agent]

The heated metallic starting material is sometimes hot-worked. In this case, the metallic starting material is rolled by a rolling roll to produce a metal plate or a metal bar. Also, the metallic starting material is piercing-rolled by the plug and skew rolls of a piercing machine to produce a metal pipe. Therefore, the metallic starting material is preferably liable to be caught by the rolling rolls or the skew rolls. If the friction coefficient of metallic starting material against a hot-working roll such as the rolling roll and the skew roll is high, the metallic starting material is liable to be caught by the hot-working rolls.

Therefore, the antioxidant agent may contain an antislipping agent to increase the friction coefficient. The antislipping agent is, for example, an oxide having a high melting point. The antislipping agent is, for example, alumina or

TABLE 1

| | Chemical composition (wt %) | | | | | | | |
| --- | --- | --- | --- | --- | --- | --- | --- | --- |
| | $SiO_2$ | $Al_2O_3$ | $B_2O_3$ | CaO | MgO | ZnO | $Na_2O$ | $K_2O$ |
| High-temperature glass frits HT1 | 66.3 | 9.6 | — | 13.1 | 1.6 | 3 | — | 6.4 |
| Medium-temperature glass frits LT1 | 51.8 | 2.6 | 28.4 | 0.2 | — | 6.3 | 8.7 | 2 |
| High-temperature glass frits HT2 | 65-70 | 5-10 | 1-3 | 10-15 | 0-3 | — | — | 5-10 |
| Medium-temperature glass frits LT2 | 50-55 | 0-5 | 20-25 | 5-10 | 0-3 | — | 10-15 | 0-5 |
| Low-temperature inorganic compound LL | — | — | 100 | — | — | — | — | — | silica. When the metallic starting material to which the antioxidant agent has been applied comes into contact with the rolls, the antislipping agent such as alumina or silica comes into contact with the rolls. At this time, since the friction coefficient of metallic starting material against the roll becomes high, the metallic starting material becomes liable to be caught by the rolls.

[Gluing Agent]

The antioxidant agent may further contain a gluing agent to improve the adhering force to the surface of metallic starting material. The gluing agent is, for example, an organic binder. The organic binder is, for example, an acrylic resin.

Further, the antioxidant agent may contain an alkali metal salt or a group 2 metal salt insoluble in water. These components prevent the viscosity of the antioxidant agent from changing with time.

[Alkali Metal Salt]

As described above, the antioxidant agent containing water is slurry (a fluid) at normal temperature. In the case where the antioxidant agent contains less than 50 wt % of water, at normal temperature, the antioxidant agent sometimes sets to gel with the elapse of time. The gelation increases the viscosity of the antioxidant agent. Also, gel lumps are sometimes produced.

It is more favorable if the secular change of viscosity of the antioxidant agent is restrained. The alkali metal salt peptizes the antioxidant agent having set to gel. Therefore, the antioxidant agent fluidizes again, and the increase in viscosity is prevented. The alkali metal salt is, for example, potassium carbonate ($KCO_3$), sodium hexametaphosphate, or the like.

[Insoluble Group 2 Metal Salt]

In the case where the antioxidant agent contains not less than 55 wt % of water, at normal temperature, the viscosity of antioxidant agent sometimes decreases with the elapse of time. Such a secular change of viscosity is preferably restrained.

The insoluble group 2 metal salt prevents the decrease in viscosity of the antioxidant agent. Herein, the group 2 metal salt is a metal corresponding to a group 2 element in the periodic table, such as beryllium, magnesium, calcium, strontium, barium, or radium. Also, "insoluble" means insoluble in water, and "insoluble in water" means that the solubility in water of 25° C. is not higher than 1000 ppm. Preferably, the insoluble group 2 metal salt is magnesium carbonate and/or calcium carbonate.

The insoluble group 2 metal salt prevents the decrease in viscosity of the antioxidant agent having been produced. The reason described below is presumed. The insoluble group 2 metal salt dissolves gradually in a solution (water). When the group 2 metal salt dissolves, group 2 metal ions are formed. Since the group 2 metal ions improve the suspension force, the secular change of viscosity of the antioxidant agent is restrained.

[Other Components]

The antioxidant agent may contain other components in addition to the above-described components. For example, the antioxidant agent may contain an inorganic electrolyte represented by sodium nitrite.

[Preferable Content of Each Component in Antioxidant Agent]

The preferable content of each component contained in the antioxidant agent in accordance with this embodiment is as described below. In the case where the content of the high-temperature glass frits is taken as 100 weight parts, the preferable content of low-temperature inorganic compound is 4 to 20 weight parts. The preferable content of antislipping agent is 15 to 35 weight parts. The preferable content of gluing agent is 1.0 to 4.0 weight parts. The preferable contents of the alkali metal salt and the insoluble group 2 metal salt are 0.1 to 1.5 weight part, respectively.

If the components in the antioxidant agent satisfy the above-described preferable contents, the above-described effects of the antioxidant agent are achieved especially effectively. However, even if the content of each of the components exceeds the preferable range, the effects of the antioxidant agent can be achieved to some extent.

[Process for Producing Antioxidant Agent]

The antioxidant agent in accordance with this embodiment is obtained by mixing the above-described components. First, the plurality of components to be contained in the antioxidant agent are prepared. Next, by using a grinding device, the plurality of components are ground and mixed to produce a mixed composition. The grinding device is, for example, a ball mill, a rod mill, a vibrating mill, a planetary mill, a tower mill, an attritor, a sand mill, or the like. The grinding device is equipped with a cylindrical grinding vessel. The prepared plurality of components are put in the grinding vessel. In the grinding vessel, balls or rods are further put. By rotating or vibrating the grinding vessel, the high-temperature glass frits and the medium-temperature glass frits are ground, and particles each having a particle diameter of, for example, not larger than 25 μm are formed. At the time of grinding and mixing, water is also contained.

By the above-described producing process, the antioxidant agent is produced.

[Process for Producing Metallic Material]

Figure 2:
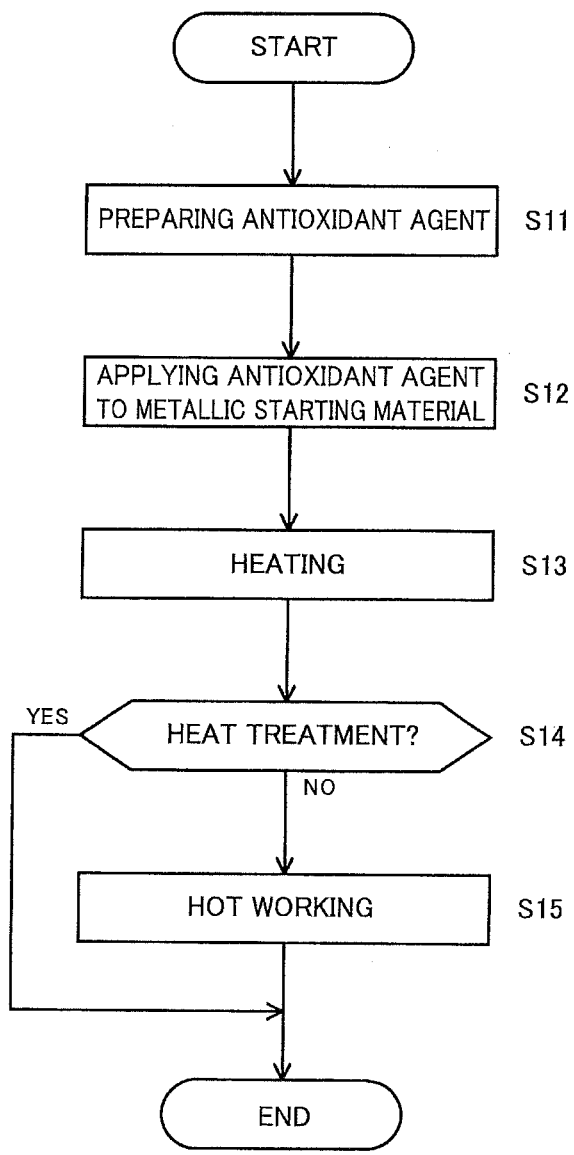
FIG. 2 is a flowchart showing one example of a process for producing a metallic material in accordance with an embodiment of the present invention.

FIG. 2 is a flowchart showing one example of a process for producing a metallic material using the above-described antioxidant agent. Referring to FIG. 2, first, the antioxidant agent in accordance with this embodiment is prepared (S11). The antioxidant agent is produced by the above-described process.

Successively, the antioxidant agent is applied to the surface of a metallic starting material before being heated (S12). That is, the antioxidant agent is applied to the surface of metallic starting material having normal temperature. The type of the metallic starting material is not subject to any special restriction. The metallic starting material consists of, for example, steel, titanium, titanium alloy, any other alloy, or the like. The steel is, for example, a carbon steel, a ferritic stainless steel, a martensitic stainless steel, an austenitic stainless steel, an alloy steel, or the like. The shape of the metallic starting material is ingot, slab, bloom, billet, plate material, bar material represented by rod material and wire rod, pipe, or the like.

The process for applying the antioxidant agent is not subject to any special restriction. A worker may apply the antioxidant agent to the surface of metallic starting material by using a brush. Also, the antioxidant agent may be applied to the surface of metallic starting material by using a spray or the like. A bath in which the antioxidant agent has been stored may be prepared, and the metallic starting material may be immersed in the antioxidant agent in the bath (so-called "dipping"). By any of these applying processes, the antioxidant agent is applied to the surface of metallic starting material. The antioxidant agent contains the potter's clay. Therefore, the antioxidant agent applied to the surface of metallic starting material is less liable to drip down from the surface of metallic starting material at normal temperature. After the antioxidant agent has been applied to the surface of metallic starting material, the antioxidant agent may be dried.

Successively, the metallic starting material to which the antioxidant agent has been applied is heated (S13). At the drying time or at the early stage of heating, the moisture of the antioxidant agent evaporates, so that the antioxidant agent solidifies. Because of containing bentonite and/or sepiolite, the antioxidant agent is less liable to peel off the surface of metallic starting material when solidifying.

When the heating temperature rises, the medium-temperature glass frits, the high-temperature glass frits, the low-temperature inorganic compound, and the like in the antioxidant agent soften and cover the surface of metallic starting material. As described above, in the board temperature range (400° C. to 1400° C.), the antioxidant agent adheres stably to the surface of metallic starting material. Therefore, scale is less liable to be produced on the surface of the heated metallic starting material.

[In the Case Where Metallic Starting Material is Heat-Treated]

In the case where the metallic starting material is heat-treated, the heat treatment temperature is sometimes not higher than 1000° C. For example, the quenching temperature of stainless steel is about 900 to 1000° C. Also, the tempering temperature is about 500 to 650° C. In the case where the metallic starting material is heat-treated, the metallic starting material is put in a heat treating furnace, and the metallic starting material is heated to the heat treatment temperature. At this time, the in-furnace temperature is increased stepwise with the elapse of time. The in-furnace temperature is controlled by a control unit, and is raised stepwise according to a predetermined heat pattern.

In the case where the heat treatment temperature is lower than 1000° C., the medium-temperature glass frits in the antioxidant agent mainly soften and cover the surface of metallic starting material. In the case where the antioxidant agent contains the low-temperature inorganic compound, the low-temperature inorganic compound and the medium-temperature glass frits mainly soften and cover the surface of metallic starting material. When the in-furnace temperature becomes a temperature close to 1000° C., the high-temperature glass frits also begin to soften, and begin to function effectively as an antioxidant agent.

As described above, in the case where the metallic starting material is heat-treated at a temperature not higher than 1000° C., the medium-temperature glass frits mainly cover the surface of metallic starting material, and prevent the production of scale.

[In the Case Where Metallic Starting Material is Hot-Worked]

In the case where the metallic starting material is hot-worked to produce a metallic material such as steel material, steel bar, steel pipe, or the like, the metallic starting material is heated to various temperature ranges.

For example, when a steel starting material (round billet) is piercing-rolled by the Mannesmann pipe making process to produce a steel pipe, the steel starting material is heated to a temperature of 1100 to 1300° C. in a heating furnace or a soaking pit. On the other hand, in the Ugine pipe making process in which the steel starting material is extruded to produce a steel pipe, the steel starting material is heated to a temperature of 800 to 1000° C. in a heating furnace or a soaking pit. The steel starting material heated in the heating furnace or the soaking pit is, in some cases, further heated to 1200° C. in a short period of time by high-frequency heating.

Further, when a starting material consisting of titanium or titanium alloy is hot-worked to produce a titanium material having a predetermined shape (plate, bar, or pipe), the heating temperature of a titanium or titanium alloy starting material is higher than the heating temperature of the steel starting material.

Thus, the heating temperature differs according to the type and producing process of metallic starting material. However, the antioxidant agent in accordance with this embodiment can respond to various heating temperatures because of containing the medium-temperature glass frits and high-temperature glass frits.

When the metallic starting material in the heating furnace or the soaking pit is heated at a temperature of 600 to 1000° C., the medium-temperature glass frits mainly soften, and cover the surface of metallic starting material. Then, when the metallic starting material is heated at a temperature not lower than 1000° C., the high-temperature glass frits mainly soften, and cover the surface of metallic starting material.

In effect, the antioxidant agent in accordance with this embodiment adheres stably to the surface of metallic starting material in a broad temperature range, and covers the surface of metallic starting material. Therefore, in various producing steps having different heating temperatures, by heating, scale can be prevented from being formed on the surface of metallic starting material.

Returning to FIG. 2, if a heat treatment step is being performed (YES in S14), after heating, heat treatment is finished through a predetermined heat treatment step. On the other hand, if a hot working step is being performed (NO in S14), the metallic starting material is hot-worked (S15). By the hot working, the metallic starting material is produced into a desired metallic material (pipe material, plate material, bar material, etc.).

In the case where the antioxidant agent contains the antislipping agent, the antioxidant agent prevents the slippage of metallic starting material with respect to the rolls of a rolling mill. For example, in the case where the antioxidant agent contains alumina particles as the antislipping agent, the alumina particles adhere to the surface of the heated metallic starting material. The metallic starting material to which the alumina particles have adhered is conveyed to the rolling mill. When the front end of metallic starting material comes into contact with the rolls, the alumina particles on the surface of metallic starting material come into contact with the rolls. At this time, the alumina particles increase the friction coefficient of the metallic starting material against the rolls, so that the metallic starting material becomes liable to be caught by the rolls.

Example

A plurality of antioxidant agents having the different contents of potter's clay and bentonite were prepared. The suspensibility, anti-dripping property, and durability after drying of each of the plurality of prepared antioxidant agents were evaluated.

[Testing Method]

The antioxidant agents given in Table 2 were prepared.

TABLE 2

| | Content (unit: weight part with respect to 100 weight parts of high-temperature glass frits) | | | | | | |
|---|---|---|---|---|---|---|---|
| Test number | High-temperature glass frits | Medium-temperature glass frits | Alumina | Water | Bentonite | Potter's clay | Suspensibility |
| 1 | 100 | 7.7 | 25.3 | 100 | 10 | 5 | Absent |
| 2 | 100 | 7.7 | 25.3 | 100 | 5 | 10 | Present |

TABLE 2-continued

| | Content (unit: weight part with respect to 100 weight parts of high-temperature glass frits) | | | | | | |
|---|---|---|---|---|---|---|---|
| Test number | High-temperature glass frits | Medium-temperature glass frits | Alumina | Water | Bentonite | Potter's clay | Suspensibility |
| 3 | 100 | 7.7 | 25.3 | 100 | 6 | 6 | Present |
| 4 | 100 | 7.7 | 25.3 | 100 | 9 | 9 | Absent |
| 5 | 100 | 7.7 | 25.3 | 100 | 4 | 4 | Present |
| 6 | 100 | 7.7 | 25.3 | 100 | 11 | 11 | Absent |
| 7 | 100 | 7.7 | 25.3 | 100 | 11 | 1 | Absent |
| 8 | 100 | 7.7 | 25.3 | 100 | 1 | 11 | Present |
| 9 | 100 | 7.7 | 25.3 | 100 | 4 | 14 | Present |
| 10 | 100 | 7.7 | 25.3 | 100 | 14 | 4 | Absent |
| 11 | 100 | 7.7 | 25.3 | 100 | 15 | 0 | Absent |
| 12 | 100 | 7.7 | 25.3 | 100 | 4 | 0 | Present |
| 13 | 100 | 7.7 | 25.3 | 100 | 8 | 0 | Present |
| 14 | 100 | 7.7 | 25.3 | 100 | 8 | 4 | Present |
| 15 | 100 | 7.7 | 25.3 | 100 | 8 | 14 | Present |
| 16 | 100 | 7.7 | 25.3 | 100 | 6 | 4 | Present |
| 17 | 100 | 7.7 | 25.3 | 100 | 6 | 14 | Present |

Referring to Table 2, all of the antioxidant agents of test numbers 1 to 17 contained high-temperature glass frits, medium-temperature glass frits, alumina, water, and suspending agent (bentonite and potter's clay). All of the high-temperature glass frits of test numbers 1 to 17 were the high-temperature glass frits HT1 in Table 1. Also, all of the medium-temperature glass frits of test numbers 1 to 17 were the medium-temperature glass frits LT1 in Table 1. The viscosities at 1200° C. of the high-temperature glass frits HT1 were in the range of $2 \times 10^2$ to $10^6$ dPa·s. The viscosities at 700° C. of the medium-temperature glass frits LT1 were in the range of $2 \times 10^2$ to $10^6$ dPa·s.

The contents (weight part) of the components with respect to 100 weight parts of the high-temperature glass frits of test numbers 1 to 17 were as given in Table 1. Specifically, in test numbers 1 to 17, the contents of high-temperature glass frits, medium-temperature glass frits, alumina used as the antislipping agent, and water were equal to each other. That is, in test numbers 1 to 17, only the contents of the suspending agents (bentonite and potter's clay) were different from each other.

[Evaluation of Suspensibility]

The antioxidant agents of test numbers 1 to 17 were produced by the above-described method. After one hour has been elapsed after production, it was observed whether or not the antioxidant agent of each test number has been slurried. Specifically, the presence of precipitates in the antioxidant agent was observed.

[Evaluation of Anti-Dripping Property]

On the slurried antioxidant agent of the antioxidant agents of test numbers 1 to 17, the evaluation of anti-dripping property was carried out. Specifically, a tank in which the antioxidant agent of the slurried test number had been put was prepared. A rectangular stainless steel plate having a surface of 75 mm×200 mm was immersed in the slurried antioxidant agent in the tank in a state of being erected. After immersing, the stainless steel plate was pulled up while being erected. Simultaneously with the pulling-up, a collecting pan was arranged under the stainless steel plate, and the antioxidant agent dripping from the stainless steel plate was collected in the collecting pan.

After the antioxidant agent had stopped dripping, the weight of the antioxidant agent adhering to the surface of stainless steel plate was measured. Also, the weight of the antioxidant agent gathered in the collecting pan was also measured.

The weight of the antioxidant agent adhering to the surface of stainless steel plate was defined as an "adhesion amount at steady time". Also the total sum of the weight of the antioxidant agent adhering to the surface of stainless steel plate and the weight of the antioxidant agent gathered in the collecting pan was defined as an "adhesion amount at early time".

For each test number, the yield was calculated based on the following Formula (1).

$$\text{Yield} = \text{adhesion amount at steady time/adhesion amount at early time} \quad (1)$$

In the above-described test, the antioxidant agent adhering to the surface of stainless steel plate contained water. As described above, when the antioxidant agent is actually used on the metallic starting material, the water component of the antioxidant agent is evaporated by drying or heating, and only the solid component (component other than water of antioxidant agent) remains on the surface of metallic starting material. Therefore, of the adhesion amount at early time and the adhesion amount at steady time, the adhesion amount of solid component was calculated. By utilizing the calculated yield, the yield of the antioxidant agent of each test number in the case where the adhesion amount of solid component in the adhesion amount at steady time was made equal (0.10 g/mm²) was determined by conversion.

[Evaluation of Anti-Peeling Property]

On the slurried antioxidant agent, an anti-peeling property test was conducted. Specifically, ten columnar test specimens consisting of a stainless steel (the chemical composition corresponds to SUS304) were prepared. Each of the test specimens had a diameter of 11 mm and a length of 10 mm.

The prepared test specimen was immersed in the slurried antioxidant agent of the test number. Then, after being pulled up, the test specimen was dried in the atmosphere of 80° C. The surface of test specimen was covered with the solidified antioxidant agent. At this time, the adhesion amount of the solidified antioxidant agent was regulated so as to be 0.25 g/mm². The adhesion amount (g/mm²) was defined by the following Formula (2).

$$\text{Adhesion amount} = \text{(total weight of 10 test specimens after antioxidant agent has been applied and dried} - \text{total weight of 10 test specimens to which antioxidant agent is not applied)/total surface area of 10 test specimens} \quad (2)$$

Next, by using test specimens (ten specimens) covered with the antioxidant agent, the rattler test was conducted by using a rattler tester specified in Japan Powder Metallurgy Association JPMA P11-1992. In this test, ten test specimens were put in a wire net basket of the rattler tester, and were rotated 300 turns at 84 rpm. After the rotation of 300 turns, the weight of ten test specimens was measured. Hereinafter, this weight is referred to as a "weight after test". After the weight after test had been measured, the adhesion amount ($\mu g/mm^2$) defined by Formula (3) was calculated.

Adhesion amount=(total weight of 10 test specimens after finish of test−total weight of 10 test specimens to which antioxidant agent is not applied)/ total surface area of 10 test specimens    (3)

It was evaluated that the larger the adhesion amount calculated by Formula (3) is, the higher the anti-peeling property is.

[Test Results]

[Suspensibility]

The evaluation results of suspensibility are given in Table 2. "Present" in the "Suspensibility" column of Table 2 indicates that the antioxidant agent of the corresponding test number has been slurried. "Absent" indicates that the antioxidant agent of the corresponding test number has not been slurried.

Referring to Table 2, the antioxidant agents of test numbers 1, 4, 6, 7, 10 and 11 had not been slurried. That is, in this example, when not lower than 9 weight parts of bentonite was contained with respect to 100 weight parts of the high-temperature glass frits, the antioxidant agent had not been slurried. On the other hand, the suspensibility (slurrying) did not depend on the content of potter's clay. However, it is presumed that if the content of water in the antioxidant agent is increased, even the antioxidant agents of test numbers 1, 4, 6, 7, 10 and 11 are slurried.

[Anti-Dripping Property]

Figure 3:
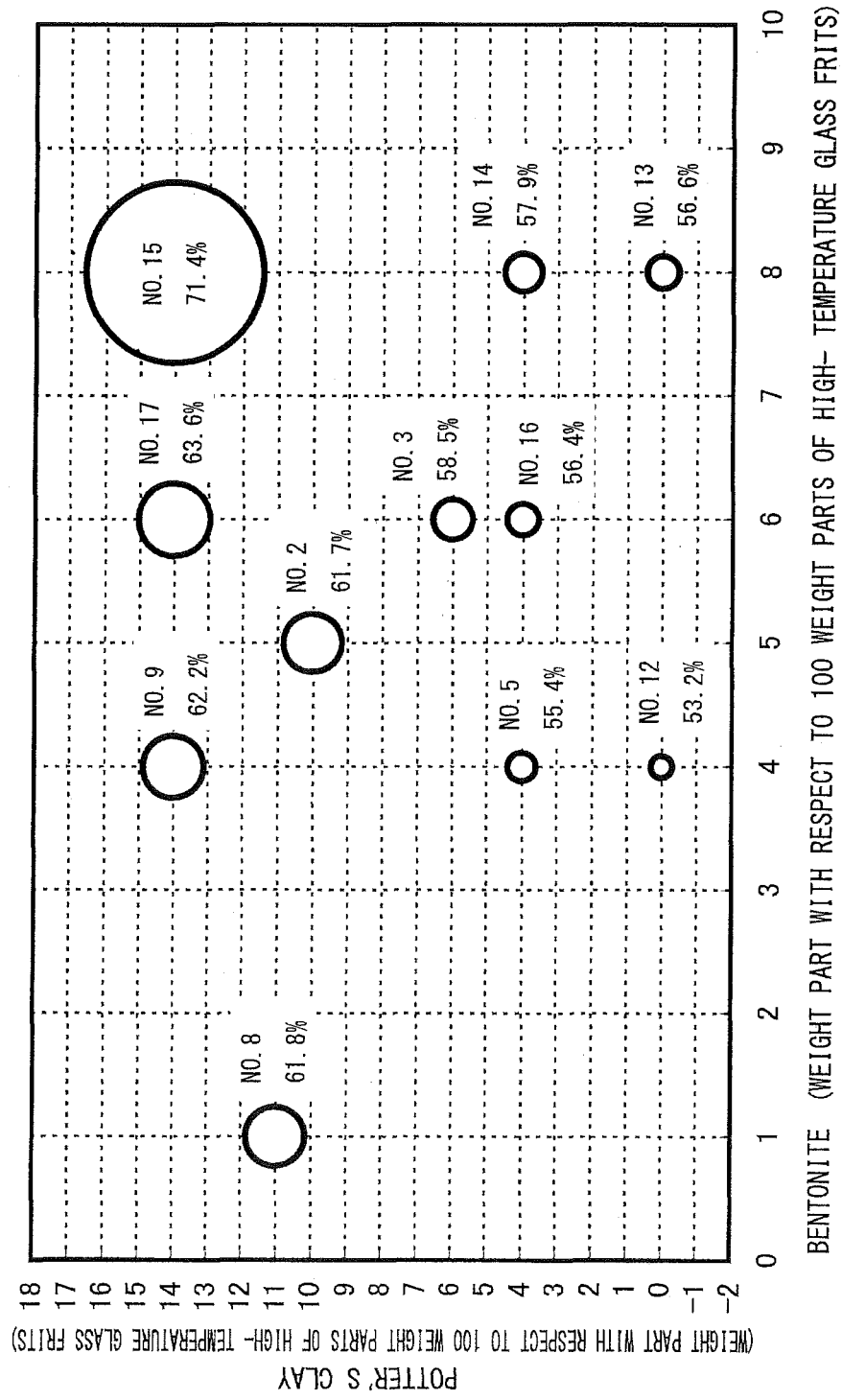
FIG. 3 is a diagram showing the relationship between the contents of bentonite and potter's clay in an antioxidant agent and the anti-dripping property in Example.

FIG. 3 is a diagram showing the evaluation result of anti-dripping property. The ordinates of the figure represent the weight part of potter's clay with respect to 100 weight parts of the high-temperature glass frits in each antioxidant agent, and the abscissas thereof represent the weight part of bentonite with respect to 100 weight parts of the high-temperature glass frits in each antioxidant agent. In the figure, the size of a circle mark indicates the magnitude of yield. The numerical values in the circle mark and the numerical values at the side of the circle mark denote test number and yield (%).

Referring to FIG. 3, as the weight part of potter's clay in the antioxidant agent increased, the yield was higher, so that the anti-dripping property was higher. Specifically, the antioxidant agents of test numbers 2, 3, 8, 9, 15 and 17 contained not less than 6 weight parts of potter's clay. Therefore, the yield was high, exceeding 58.0%.

On the other hand, the antioxidant agents of test numbers 5, 12 to 14, and 16 contained less than 6 weight parts of potter's clay. Therefore, the yield was lower than 58.0%.

Also, referring to FIG. 3, the content of bentonite did not exert so great influence on the anti-dripping property. More specifically, bentonite did not exert an influence on the anti-dripping property as compared with potter's clay.

[Anti-Peeling Property]

Figure 4:
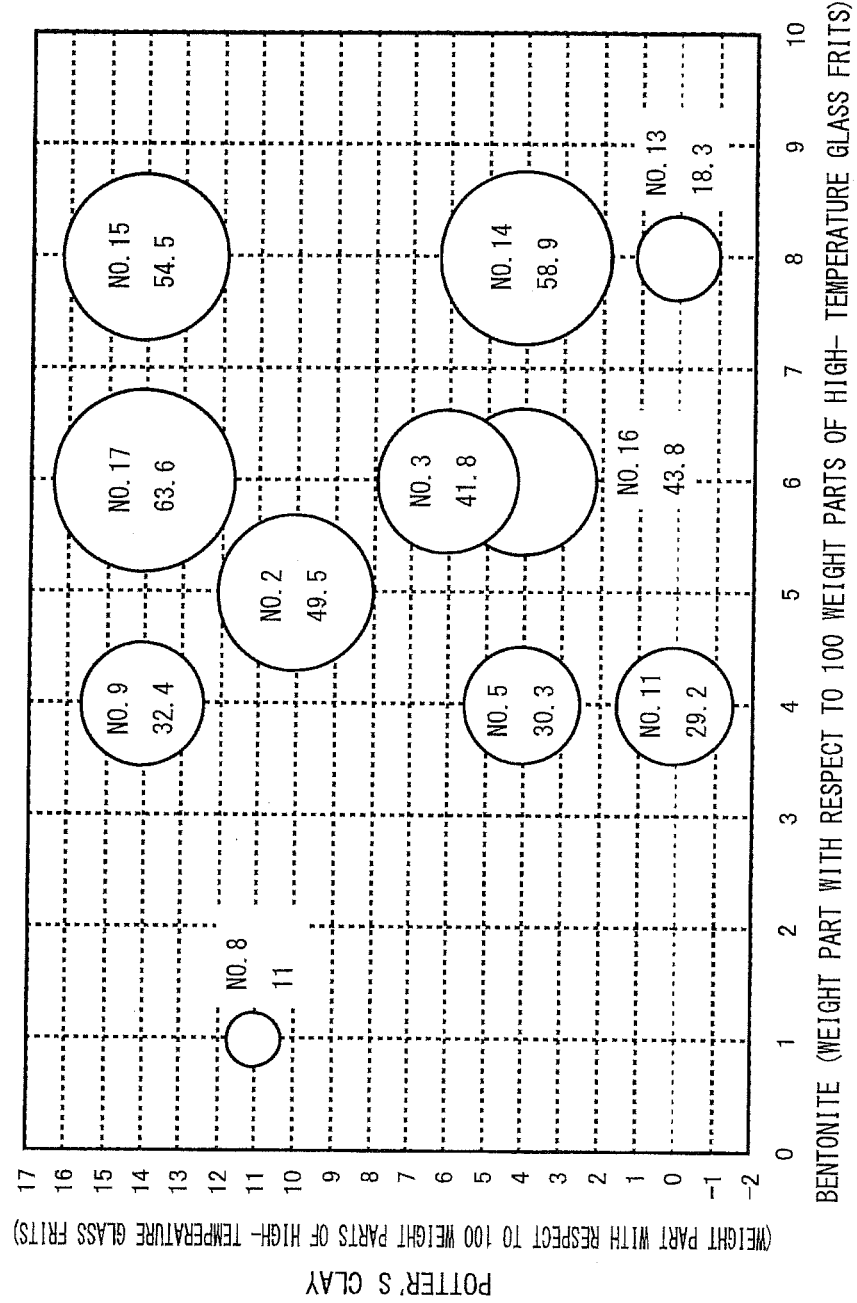
FIG. 4 is a diagram showing the relationship between the contents of bentonite and potter's clay in an antioxidant agent and the anti-peeling property in Example.

FIG. 4 is a diagram showing the evaluation result of anti-peeling property. The ordinates of the figure represent the weight part of potter's clay with respect to 100 weight parts of the high-temperature glass frits in each antioxidant agent, and the abscissas thereof represent the weight part of bentonite with respect to 100 weight parts of the high-temperature glass frits in each antioxidant agent. In the figure, the size of a circle mark indicates the magnitude of adhesion amount. The numerical values in the circle mark and the numerical values at the side of the circle mark denote test number and adhesion amount ($\mu g/mm^2$) obtained by Formula (3).

Referring to FIG. 4, as the weight part of bentonite in the antioxidant agent increased, the adhesion amount was larger. Specifically, the antioxidant agents of test numbers 2, 3, 5, 9, 11, and 13 to 17 contained not less than 4 weight parts of bentonite. Therefore, the adhesion amount exceeded 15 $\mu g/mm^2$, and excellent anti-peeling property was achieved.

On the other hand, the antioxidant agent of test number 8 contained less than 4 weight parts of bentonite. Therefore, the adhesion amount was smaller than 15 $\mu g/mm^2$. However, even the antioxidant agent of test number 8 achieved some degree of anti-peeling property.

The above is the explanation of an embodiment of the present invention. The above-described embodiment is merely an illustration for carrying out the present invention. Therefore, the present invention is not limited to the above-described embodiment, and the above-described embodiment can be carried out by being changed as appropriate without departing from the spirit and scope of the present invention.

INDUSTRIAL APPLICABILITY

The antioxidant agent in accordance with the present invention can be applied widely to a metallic starting material to be heated. In particular, it can be utilized for a metallic starting material to be heat-treated or a metallic starting material to be hot-worked.

The invention claimed is:

1. An antioxidant agent to be applied to a surface of a metallic starting material, containing:
    first glass frits having a viscosity of $2 \times 10^2$ to $10^6$ dPa·s at 1200° C.;
    second glass frits having a viscosity of $2 \times 10^2$ to $10^6$ dPa·s at 700° C.;
    potter's clay; and
    at least one of bentonite and sepiolite,
    wherein the antioxidant agent contains 6 to 30 weight parts of the potter's clay with respect to 100 weight parts of the first glass frits and not lower than 4 weight parts and lower than 9 weight parts of at least one of the bentonite and sepiolite with respect to 100 weight parts of first glass frits.

2. The antioxidant agent according to claim 1, wherein the antioxidant agent contains 4 to 20 weight parts of the second glass frits with respect to 100 weight parts of the first glass frits.

3. The antioxidant agent according to claim 1, further containing an inorganic compound having a melting point of 400 to 600° C.

4. The antioxidant agent according to claim 3, wherein the inorganic compound is at least one of boric acid and boron oxide.

5. A process for producing a metallic material, comprising the steps of:
    applying the antioxidant agent according to claim 1 to the surface of a metallic starting material; and
    heating the metallic starting material to which the antioxidant agent has been applied.

* * * * *